United States Patent [19]

Stumphauzer et al.

[11] Patent Number: 4,960,628
[45] Date of Patent: Oct. 2, 1990

[54] METHOD AND APPARATUS FOR IN SITU FORMING OF A WALL PLATE GASKET

[75] Inventors: William C. Stumphauzer; Raymond M. Fetcenko, both of Elyria, Ohio

[73] Assignee: Nordson Corporation, Westlake, Ohio

[21] Appl. No.: 392,058

[22] Filed: Aug. 10, 1989

[51] Int. Cl.$^5$ .......................... B32B 1/04; B32B 1/10; E05B 15/02; H02G 3/14

[52] U.S. Cl. ........................................ 428/81; 70/452; 156/79; 156/244.11; 156/244.12; 428/65; 428/66; 428/80; 428/157; 428/159

[58] Field of Search .................. 70/452; 220/241, 242; 156/79, 244.11, 244.12; 428/65, 66, 80, 81, 83, 157, 159, 160, 161

[56] References Cited

U.S. PATENT DOCUMENTS

| | | | |
|---|---|---|---|
| 3,528,866 | 9/1970 | Stevens | 428/161 |
| 4,331,716 | 5/1982 | Stark | 427/282 |
| 4,352,712 | 10/1982 | Paul | 156/540 |
| 4,385,777 | 5/1983 | Logsdon | 285/12 |
| 4,444,809 | 4/1984 | Rau | 427/163 |
| 4,560,083 | 12/1985 | Danico | 220/241 |
| 4,592,690 | 6/1986 | Busch | 413/19 |
| 4,650,387 | 3/1987 | Busch | 413/19 |

Primary Examiner—William J. Van Balen
Attorney, Agent, or Firm—Wood, Herron & Evans

[57] ABSTRACT

A resilient gasket seals a connection between a wallplate rim and a wall, and is formed in situ by locating an insert on the backside of the wallplate inside of the rim and then introducing a flowable gasket material therebetween. The insert serves as a temporary dam during the in situ formation of the resilient gasket and is adapted to be removed from the wallplate prior to mounting to the wall. The insert extends above the wallplate rim, thereby protecting the resilient gasket during shipping, and also enabling vertical stacking of the wallplates prior to curing of the flowable gasket material. Use of this insert reduces the manufacturing time and labor costs in forming such wallplates.

24 Claims, 2 Drawing Sheets

METHOD AND APPARATUS FOR IN SITU FORMING OF A WALL PLATE GASKET

FIELD OF THE INVENTION

This invention relates to in situ forming of a gasket on the backside of a wallplate.

BACKGROUND OF THE INVENTION

A wallplate or an escutcheon plate is typically mounted to a wall in order to frame a device that projects through a hole in the wall, such as a water spout for a bathtub or a shower, or the control knobs for controlling water flow through such spouts. The wallplate provides protection for the projecting device and also conceals the hole through which it projects. Wallplates are also used in a number of other applications, including ceiling and wall lights, outdoor light fixtures or meters. The shape or configuration of the wallplate is adapted to accommodate the application.

A wallplate has a peripheral rim that substantially contacts a wall when the wallplate is mounted thereto. The rim recedes in an arc from the wall and basically defines the thickness of the wallplate. A wallplate may also have a peripheral flange. In order to prevent moisture or other substances from getting behind the wallplate, or between the wallplate rim or flange and the wall, a seal must be provided around the inner periphery of the rim.

One method of forming this seal involves the application of a caulking compound between the rim and the wall after the wallplate has been mounted. However, it is often difficult to produce a uniformly consistent seal in this manner and labor costs are considered excessive.

Another method of forming the seal between the rim and the wall includes adhering a preformed, adhesively backed gasket to the backside surface of the wallplate prior to mounting to the wall. The gasket can be adhered either at the installation site or at the place of manufacture. Regardless, this method requires the keeping of a separate inventory of gaskets and wallplates, and the subsequent matching up and adhering of the gaskets to the wallplates prior to installation, all of which leads to an increase in the total cost of the final product.

It is an object of the invention to provide a simple method for forming a gasket to seal the connection between a wallplate rim and a wall.

It is another object of the invention to form a gasket seal between a mounted wallplate and a wall in a cost effective manner.

SUMMARY OF THE INVENTION

This invention contemplates in situ formation of a high profile gasket during the manufacturing process. The in situ gasket is formed with a removable insert mold located on the backside of the wallplate interiorly of the rim. The insert acts as a temporary dam to contain the flow of a liquid gasket material until the gasket has cured.

To these ends, in accordance with a preferred embodiment of the invention, a conventional wallplate has a peripheral rim which substantially contacts a wall when mounted thereto, a resilient high profile gasket secured to the backside surface of the wallplate interiorly of the rim and an insert located on the backside of the wallplate interiorly of the gasket and adapted to be removed prior to mounting of the wallplate to the wall.

The wallplate rim and an outwardly facing surface of the insert are substantially parallel and define a channel on the backside of the wallplate into which the flowable gasket material is to be introduced. The removable insert also has a relatively flat inner portion which conforms to, and is supported by, the backside surface of the wallplate. The inner portion centers the insert on the wallplate during in situ formation of the gasket in the channel. The gasket material may be either a thermoplastic hot melt with an application temperature in the range of about 250–400° F., or a foam material with an application temperature ranging anywhere from ambient temperature to about 400° F. Two component materials may also be used, as well as noncurable caulks.

According to a feature of the preferred embodiment of the invention, the outwardly directed surface of the removable insert extends above the wallplate rim so that wallplates can be stacked prior to curing of the gasket material. According to this embodiment, the insert is retained upon the wallplate during curing of the gasket material and subsequently during shipping and is only removed at the installation site just prior to mounting of the wallplate. Thus, the insert also serves in a protective capacity as part of the packaging material. This permits high speed automated formation of a high profile resilient gasket with reduced labor costs.

Alternately, the insert could also be a reusable mold or die that is temporarily placed on the backside of the wallplate prior to forming of the gasket, and then removed after curing or forming of the gasket material has been completed. This entire process would take place in the factory. According to this method, it may also be desirable to cool the insert mold prior to placement upon the backside of the wallplate, in order to speed up curing and to prevent damage to the gasket when the insert mold is removed.

The use of an insert permits the formation of an unusually high gasket profile with uniformity in appearance. The insert also allows the cross sectional shape of the gasket to be varied to suit the application of the wallplate. A material savings is also realized because a uniform and consistent amount of gasket material is used in forming each wallplate gasket. According to another feature of the invention, the wallplate gaskets are produced at a higher rate of speed and at a reduced labor cost, as compared to prior wallplate seals.

These and other features of the invention will be more readily understood in view of the following detailed description and the drawings in which:

DETAILED DESCRIPTION OF THE DRAWINGS

Figure 1:
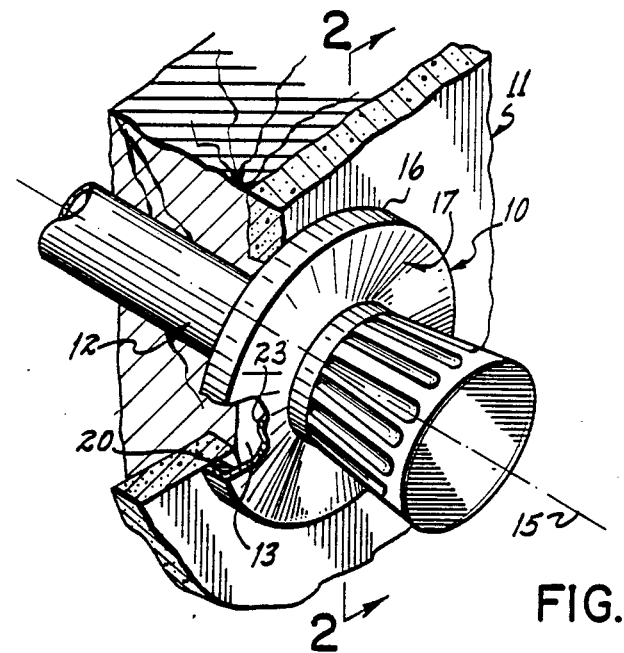
FIG. 1 is a perspective view showing a wallplate in accordance with a preferred embodiment of the invention.
Figure 2:
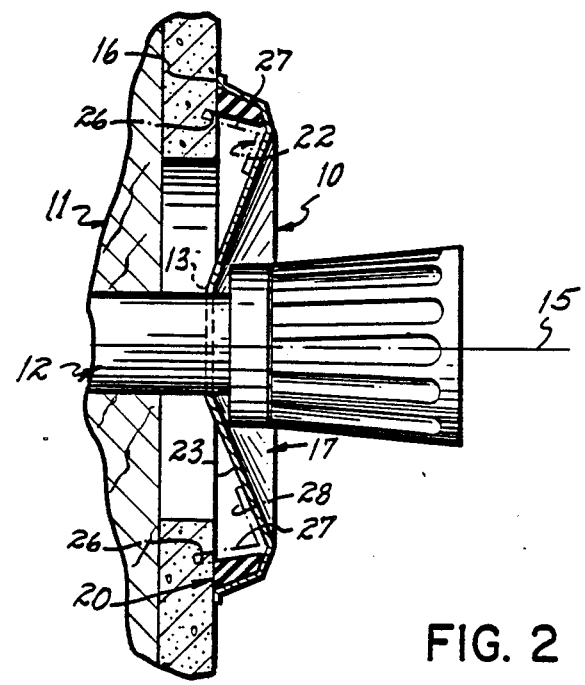
FIG. 2 is a cross-sectional view taken along lines 2—2 of FIG. 1, and showing in addition and in phantom lines an insert that forms part of the invention.

FIG. 1 shows a wallplate 10 mounted to a wall 11. The wall 11 has a handle or object 12 which projects through a hole 13 formed therein. The handle 12 may be any type of conduit or flow control device, including a control knob for controlling water flow through a water spout, a control lever for a drain plug, a utility meter, a spout itself, or the like. The wallplate 10 provides protection for the projecting handle 12 and also serves to conceal the hole 13 in the wall 11. Typically, as shown in FIGS. 1 and 2, the wallplate 10 is mounted on an axis 15 that is perpendicular to the wall 11.

While the Figures show a cylindrically shaped wallplate 10 or escutcheon plate that is mounted to a planar surface, i.e., the wall 11, it is to be understood that the present invention is applicable to any type of device wherein a plate member 10 or any other body is used to cover a curved or a planar surface or structure and a gasket is required to seal or partially seal a peripherally contacting rim or edge of the member, such as heating or air conditioning duct diffusers, oil pan gaskets or microwave oven doors. It is not required that the surface or structure be planar or that the peripheral rim of the plate member be any particular shape.

In accordance with a preferred embodiment of the invention, as shown in the Figures, the wallplate 10 is decoratively finished and sized to frame handle 12 and hole 13. The wallplate 10 has a peripheral rim 16 which substantially contacts the wall 11 when mounted. The rim 16 defines the axial dimension, or thickness, of the wallplate 10. The wallplate 10 also has a first or exterior surface 17 that is directed away from the wall 11 when the wallplate 10 is mounted thereto. As shown in FIG. 2, while the wallplate rim 16 peripherally contacts wall 11, a resilient gasket 20 is necessary in order to provide an effective seal therebetween. According to the invention, the gasket 20 is formed in situ between the rim 16 and a removable insert 22 which is located on a second or backside surface 23 of the wallplate 10. The gasket 20 may be formed from a curable thermoplastic that is extruded into a gap or channel 25 located between the insert 22 and the rim 16. The gasket 20 may also be formed by a cellular polymer, or a foam, that is introduced into the gap 25.

Figure 3:
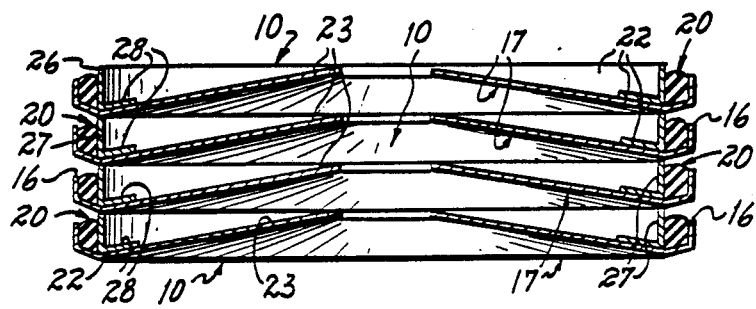
FIG. 3 is a cross-sectional view of a plurality of stacked wallplates made in accordance with a preferred embodiment of the invention.
Figure 4:
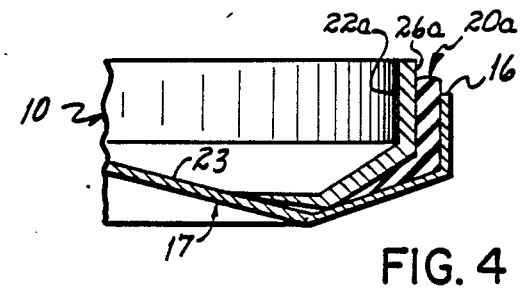
FIG. 4 is a cross-sectional view, partially broken away of another embodiment of the invention.
Figure 5:
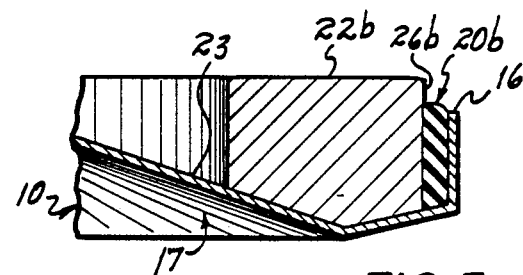
FIGS. 5, 6, 7 and 8 are cross-sectional views similar to FIG. 4, each of which show an additional embodiment of the invention.
Figure 6:
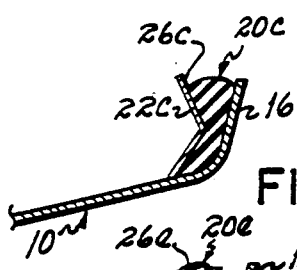
Figure 7:
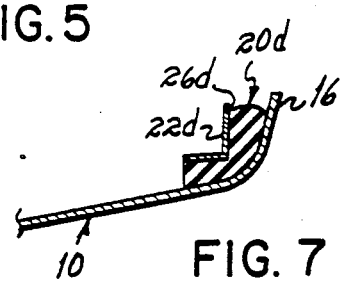

The insert 22 has a surface 26 directed outwardly from the axis 15 and which forms a temporary dam or barrier to prevent inward flow of the settable gasket material during manufacture, thereby forming or defining one side of the gasket 20. The insert 22 may have a wide variety of sizes and shapes, depending upon the application. FIGS. 2 and 3 show an insert 22 that has a side portion 27 that is substantially parallel with rim 16 and a relatively flat inner portion 28 that supports the side portion 27 and which centers the insert mold 22 with respect to the rim 16. The inner portion 28 also conforms to the size and configuration of the backside surface 23 of wallplate 10.

The insert 22 may either be a removable part used in an automated process, with the part being removed from the wallplate 10 after formation of the gasket 20, or it may be a removable disposable part that is retained with the wallplate 10 during shipping, and which forms part of the packaging scheme. In either case, the shape of the insert 22 will be determined by the type of gasket 20 that is desired. If the gasket 20 is formed from a thermoplastic material extruded into the gap 25, the insert 22 must be able to withstand temperatures ranging from about 250° F.–400° F. If the insert 22 is to be disposable, and part of the packaging, it must be also sufficiently rigid to permit stacking thereon of additional wallplates 10, as shown in FIG. 3. As mentioned previously, according to a feature of this preferred embodiment of the invention, aside from the fact that the insert 22 serves as a temporary dam to enable the formation of a high profile gasket 20, the insert 22 also protects the gasket 20 during shipping and curing. For either type of gasket 20, thermoplastic or foam, an insert 22 of high density polyethylene has proved suitable.

With this invention, a resilient gasket 20 with an unusually high profile can be formed during the manufacture of the wallplate 10. Basically, the height of the resilient gasket 20 is limited only by the axial dimension of the wallplate 10. As shown clearly in FIG. 3, side portion 27 of insert 22 extends axially above rim 16 in order to support one or more wallplates 10 thereon.

Figure 8:
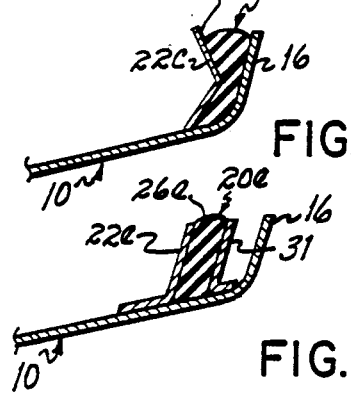

With reference now to FIGS. 4 through 8, there are illustrated various different embodiments of inserts 22a (FIG. 4), 22b (FIG. 5), 22c (FIG. 6), 22d (FIG. 7) and 22e (FIG. 8) which may be utilized in the practice of this invention to form in situ the gaskets 20a, 20b, 20c, 20d and 20e, respectively. While these inserts differ in cross-sectional configuration from the inserts 20 of FIGS. 1–3 in order to achieve variation in gasket 20 profile, all of these profiles provide a temporary dam for the in situ molding of a gasket and stacking support during curing and shipping of the completed wallplates 10. Note that FIG. 8 depicts a gasket 20e that is formed between an interior insert 22e and an exterior insert 31.

A method for carrying out a preferred embodiment of the invention includes placing an insert 22 upon the backside surface 23 of a wallplate 10. The inner portion 28 of the insert 22 is configured to be centered upon the backside surface 23, thus locating the side portion 27 and surface 26 interiorly of the rim 16, with a gap 25 or channel located therebetween. A flowable resilient gasket material, either an uncured thermoplastic or a foam material prior to foaming, is then introduced into the channel 25. If a thermoplastic is used, the volume of curable material can be easily calculated to achieve the desired height, and that amount is then introduced into the channel 25. If a foam is used, the amount of foam required to expand to the required height is introduced into the channel 25. Typically, the foam is formed by mixing a gas into the gasket material under pressure to dissolve the gas therein, and the pressurized mixture is then dispensed into the gap 25 to release the gas from solution and foam the material.

It may be desirable in some cases to form the gasket 20 with a slightly greater axial dimension than that of the rim 16. The wallplates 10 can be stacked immediately upon completion of introducing of the gasket material because the insert mold 22 acts as a dam to prevent inward flow. As mentioned previously, the stacked inserts 22 provide support for other wallplates 10 located thereabove.

According to the preferred embodiment, the insert mold 22 is removed at the wallplate site prior to mounting of the wallplate 10 to a wall 11. Mounting of the wallplate 10 with the resilient gasket 20 mounted thereon effectively seals the peripheral connection between the wall 11 and the wallplate 10.

While a preferred embodiment of the invention has been described, it is to be understood that various modifications could be made without departing from the spirit of the invention. Accordingly, it is to be understood that changes may be made without departing from the scope of the invention as particularly set out and claimed.

We claim:

1. An article comprising:
   a plate member for mounting to a structure in order to seal said member to said structure;
   a first surface on said plate member adapted to be directed away from said structure;
   a second surface on said plate member adapted to face said structure;
   an in situ formed resilient gasket secured to said second surface for effectively sealing said plate member to said structure when said plate member is mounted thereon; and
   an insert located on said second side of said plate member adjacent said gasket, said insert acting as a mold dam surface during in situ molding of said gasket and being removable from said plate member prior to mounting of said plate member to said structure.

2. The article claimed in claim 1 wherein said insert comprises a side portion which extends from said second surface a distance at least as great as said gasket, an inner portion located adjacent said second surface, and means associated with said second surface to engage said inner portion for locating said insert in a predetermined position.

3. The article claimed in claim 2 wherein said side portion extends from said second surface a distance that is greater than said gasket.

4. The article claimed in claim 2 wherein said side portion is configured to provide a predetermined profile to one side of said gasket.

5. The article as claimed in claim 1 wherein said article includes an upstanding rim extending from said second surface, said rim being configured to conform to the surface of said structure when said article is mounted thereon and acting as a mold dam surface during in situ molding of said gasket.

6. The article claimed in claim 1 further including a second insert located on said second side and extending adjacent said insert for forming one side of said gasket.

7. The article of claim 1 wherein said gasket comprises a thermoplastic material.

8. The article of claim 1 wherein said gasket comprises a foamed material.

9. The article of claim 1 wherein said insert comprises high density polyethylene.

10. The article claimed in claim 8 wherein said foam is formed by mixing a gas into the gasket material under pressure to dissolve said gas into said gasket material, and said gasket material is then dispensed onto said article to release said gas from solution and foam said material.

11. An article comprising:
    a wall plate adapted to be mounted to a wall about an axis perpendicular to said wall, the wall plate having a peripheral rim adapted to substantially contact the wall when mounted thereto;
    an in situ molded resilient gasket located interiorly of said rim and adapted to seal the connection between a wall and said wall plate when said wall plate is mounted thereto; and
    a removable insert located interiorly of said gasket, said insert acting as a mold dam surface during in situ molding of said gasket and being removed prior to mounting of said wall plate to a wall, the insert having an inner portion sized and shaped to centrally locate said insert upon a second surface of said plate member, and a side portion contacting said gasket and extending axially beyond said rim.

12. A method of manufacturing a plate member to be mounted on and at least partially sealed to a structure, said plate member having a first surface for facing away from said structure, a second surface for facing towards said structure, and a gasket secured to said second surface for sealingly engaging said structure, said method comprising:
    placing a removable insert on said second surface of said plate member, said insert extending outwardly from said second surface; and
    dispensing curable gasket material onto said second surface adjacent said insert to form a resilient gasket in situ with said insert forming one surface of said gasket.

13. The method as claimed in claim 12 wherein said insert extends away from said second surface a distance greater than said gasket, and further including the step of forming at least one additional said plate member and vertically stacking said additional plate member upon said insert of a previously formed plate member prior to curing of said gasket material.

14. The method as claimed in claim 12 wherein said plate member is inserted into a package prior to curing of said gasket material.

15. The method as claimed in claim 12 wherein said plate member further includes a peripheral rim extending away from said second surface for engaging said structure and said insert is placed such that the insert extends generally parallel to said rim, said insert and said rim forming the opposite sides of said gasket.

16. The method as claimed in claim 12 further including providing a second insert generally parallel to said first insert such that the inserts together form opposite sides of said gasket.

17. The method as claimed in claim 12 further including providing a profiled surface to said insert which in turn forms a predetermined profile on a side of said gasket.

18. A method as claimed in claim 12 further including the step of removing said insert from said plate member prior to mounting on a structure.

19. The method of claim 12 wherein said curable gasket material is introduced by extruding.

20. The method of claim 12 wherein said curable material is introduced at a temperature of at least 400° F.

21. The method of claim 12 wherein said curable material is a thermoplastic.

22. The method of claim 12 wherein said curable material is a foam.

23. The method of claim 22 wherein said foam is formed by mixing a gas into the gasket material under pressure to dissolve said gas into said gasket material, and said gasket material is then dispensed onto said article to release said gas from solution and foam said gasket material.

24. An article comprising:
    a member adapted to be mounted to a structure, the member having a first surface to be directed away from said structure and a second surface adapted to face said structure and a rim located therebetween for peripherally contacting said structure when said member is mounted thereto;

an in situ formed resilient gasket secured to said second surface interiorly of said rim for effectively sealing a connection between said member and said structure when said member is mounted thereon; and a removable insert located on said second surface of said member interiorly of said gasket, said insert acting as a mold dam surface during in situ molding of said gasket and being removed from said article prior to mounting of said member to the structure.

* * * * *